US008683006B2

(12) United States Patent
Veen et al.

(10) Patent No.: US 8,683,006 B2
(45) Date of Patent: Mar. 25, 2014

(54) METHOD AND SYSTEMS FOR SERVING FONTS DURING WEB BROWSING SESSIONS

(75) Inventors: Jeffrey P. Veen, San Francisco, CA (US); Bryan R. Mason, San Francisco, CA (US); Ryan K. Carvar, San Francisco, CA (US); Gregory J. Veen, San Francisco, CA (US); John Allsopp, Bundenna (AU)

(73) Assignee: Adobe Systems Incorporated, San Jose, CA (US)

( * ) Notice: Subject to any disclaimer, the term of this patent is extended or adjusted under 35 U.S.C. 154(b) by 445 days.

(21) Appl. No.: 12/839,068

(22) Filed: Jul. 19, 2010

(65) Prior Publication Data

US 2012/0016964 A1    Jan. 19, 2012

Related U.S. Application Data

(60) Provisional application No. 61/365,324, filed on Jul. 17, 2010.

(51) Int. Cl.
*G06F 15/16* (2006.01)

(52) U.S. Cl.
USPC .......................................... 709/217; 709/219

(58) Field of Classification Search
USPC ...................... 709/217, 219; 726/2–21, 26–29
See application file for complete search history.

(56) References Cited

U.S. PATENT DOCUMENTS

| 6,012,071 | A  | * | 1/2000  | Krishna et al. ............. 715/201 |
| 6,065,008 | A  | * | 5/2000  | Simon et al. .................... 1/1 |
| 6,226,642 | B1 |   | 5/2001  | Beranek et al. |
| 6,324,500 | B1 |   | 11/2001 | Amro et al. |
| 6,412,008 | B1 |   | 6/2002  | Fields et al. |
| 6,853,980 | B1 |   | 2/2005  | Ying et al. |
| 6,882,344 | B1 |   | 4/2005  | Hayes et al. |
| 6,886,013 | B1 |   | 4/2005  | Beranek |
| 7,627,813 | B2 |   | 12/2009 | Roser |
| 7,640,498 | B2 |   | 12/2009 | Koechley et al. |
| 2002/0010725 | A1 | | 1/2002 | Mo |
| 2004/0177056 | A1 | * | 9/2004 | Davis et al. ....................... 707/1 |
| 2005/0080839 | A1 | | 4/2005 | Kuwata et al. |

(Continued)

OTHER PUBLICATIONS

Chi-Wing Lo and Qin Lu, "Automatic Font Set Detection", Proc. 19th Int'l Conf. Comp. Proc. of Oriental Languages, Conf. (ICCPOL 2001), pp. 57-60, May 14-16, 2001, Seoul, Korea.

(Continued)

*Primary Examiner* — Shirley Zhang
(74) *Attorney, Agent, or Firm* — Schwegman Lundberg & Woessner, P.A.

(57) ABSTRACT

A font server is configured to verify that a request for a font file originates with a web page of a web site licensed to use the font file, and, if so, to download the font file to a web browser. Rather than just downloading the font file directly, however, the font server first provides the web browser a script configured to determine information regarding the web browser sufficient for the font server to determine which of a plurality of font files available to the font server to provide to the browser. When the script executes within the browser, the information is gathered and returned to the font server. Thereafter, the font server provides an appropriate font file to the web browser. Preferably, the font file is configured so as to be protected against unauthorized use.

20 Claims, 3 Drawing Sheets

(56) References Cited

U.S. PATENT DOCUMENTS

| | | | |
|---|---|---|---|
| 2007/0055934 A1 | 3/2007 | Adamson | |
| 2010/0023581 A1 | 1/2010 | Lahav | |
| 2010/0114923 A1 | 5/2010 | McVady et al. | |
| 2011/0093565 A1* | 4/2011 | Bacus et al. | 709/219 |
| 2011/0203000 A1* | 8/2011 | Bacus et al. | 726/26 |
| 2011/0271180 A1* | 11/2011 | Lee | 715/269 |

OTHER PUBLICATIONS

Timothy W. Bickmore and Bill N. Schilit, "Digestor: Device-independent Access to the World Wide Web", Computer Networks and ISDN Systems, Papers from 6th Int'l World Wide Web Conf., vol. 29, Issues 8-13, pp. 1075-1082, Sep. 1997.

John Allsopp, "Ubiquitous web font embedding just got a step closer", posted at http://www.webdirections.org/blog, Oct. 19, 2008, updated May 2009.

* cited by examiner

METHOD AND SYSTEMS FOR SERVING FONTS DURING WEB BROWSING SESSIONS

RELATED APPLICATIONS

This application is a NON-PROVISIONAL of U.S. Provisional Patent Application 61/365,324, filed Jul. 17, 2010, incorporated herein by reference.

FIELD OF THE INVENTION

The present invention relates to systems and methods for serving font files to computer based software applications (e.g., web browsers) during web browsing and other sessions which require the use of a font file not otherwise available at a client computer system at the time of the browsing session.

BACKGROUND

Fonts, as the term is customarily used, are styles of character sets (glyphs) of various typefaces. The characters of the sets may include letters, numbers, punctuation marks, and other ideograms and symbols. For example, a typeface "Arial", may include fonts that are designated "bold", "italics", "roman", etc., each of which may include stylized letters, numbers, punctuation marks, etc., of different sizes.

In the context of computer systems, fonts, or perhaps more properly font files, are data files that contain the set of glyphs or other symbols. Such font files come in a variety of forms, including bitmap fonts, in which each of the glyphs and other symbols, are represented by a series of dots or pixels when displayed on a computer display; outline or vector fonts, which are represented as instructions to the computer system for drawing the glyphs and other symbols; and stroke fonts, which use different forms of information to convey the information needed for the computer to properly display the various glyphs and symbols. TrueType™ fonts, commonly used in connection with various computer software applications, are a form of vector font.

Whether for artistic or other reasons, a web site designer will often employ specific fonts for particular text within a web page. That is, the designer will create the web page (which is really a set of instructions to be executed by a computer software application, for example a web browser), so that particular text on the page is to be displayed in a specific typeface of a specific (or sometimes relative) size and with certain effects. Until recently, the designer's goal of having the web page rendered with the intended font when viewed by a user would only be achieved if the user's computer system had a copy of the proper font file installed locally. Absent such a locally installed font file, the web page would be rendered using a replacement font (often decided based on established default settings for the web browser or user-specified preferences for such instances) or might not be displayed at all (or at least in part not at all).

To avoid such situations, web designers had to resort to instantiating text as images in order to preserve the intended font. While such images allowed for web browser to accurately reproduce the artistic or other effects that the web designer was seeking to attain when a web browser rendered the subject web page, it created unintended problems. One such problem is that, in some cases, it made the web pages larger (in terms of file size) and, consequently, the web pages may have taken longer to download to a browser than would otherwise be the case if images were not present. Further, because the text was now embedded in an image file, it was often not searchable by web crawlers and other agents associated with search engines and the like. Hence, the web page may go unnoticed by web browsers since it would not appear in search results for queries seeking the very information to which the image-based text pertains.

More recently, web browsers were enhanced to be able to download font files which might not otherwise be present on a host computer system. Accordingly, web designers were able to include instructions in web pages which directed a web browser to download from the web site hosting the web page those font files necessary to render the web page in the manner intended by the web designer. This scheme was not without problems. For example, it required the user to employ a web browser that supported the font file(s) to be downloaded. Moreover, it created an environment in which the font files were vulnerable to unlicensed proliferation.

The font files used by web designers are typically not created by those web designers. Instead, the font files (or more generally the typefaces which are the basis of the font files) are created by typeface designers and the font files are subsequently licensed by the typeface designers (or their agents) to the web designers and others (e.g., computer software developers) for use in connection with designated activities. Allowing web browsers to download font files whenever the browsers encounter new web pages that employ fonts not currently supported by the browsers could soon lead to a situation where a user (or web browser) has access to all of the font files it needs and so eliminates licensing opportunities for the typeface designers. Accordingly, such schemes are not favored by typeface designers.

SUMMARY OF THE INVENTION

In one embodiment of the invention, a font server is configured to verify that a request for a font file originates with a web page of a web site licensed to use the font file, and, if so, to download the font file to a web browser. Rather than just downloading the font file directly, however, the font server first provides the web browser means (e.g., a script) configured to determine information regarding the web browser sufficient for the font server to determine which of a plurality of font files available to the font server to provide to the browser. When the script executes within the browser, the information is gathered and returned to the font server. Thereafter, the font server provides an appropriate font file to the web browser. Preferably, the font file is configured so as to be protected against unauthorized use.

The font server may verify that the request is associated with an authorized web site by consulting an account database to determine whether the font file is registered for use in connection with the web site. The web site may be identified for such purposes according to referrer request information included in the initial request received by the font server from the web browser.

These and further features of the present invention are discussed in greater detail below.

BRIEF DESCRIPTION OF THE DRAWINGS

The present invention is illustrated by way of example, and not limitation, in the figures of the accompanying drawings in which.

DETAILED DESCRIPTION

Described herein are systems and methods for serving font files to computer based software applications (e.g., web browsers) during web browsing and other sessions which require the use of a font file not otherwise available at a client computer system at the time of the browsing session. The present methods and systems provide for the distribution of the font files in a manner which does not usurp licensing opportunities for typeface developers or font file creators. Indeed, new licensing models are provided through use of the present methods and systems. At the same time, work by web site designers is not compromised by having their web pages rendered in unintended or undesirable fonts. Nor do the web site designers have to rely on embedded text within images in order to have that text rendered in an intended font.

As more fully discussed below, embodiments of the present invention provide a font server which may, but need not necessarily, be distinct from a web server which hosts a subject web site. The font server is associated with a font library, that is, a repository of various font files available for downloading to a computer software application (e.g., a web browser or other application) engaged in a web browsing or other session when that application requires use of a font file not otherwise available at a client computer system hosting the application at the time of the font file is needed. The font file(s) are downloaded from the font server only in connection with verified accesses to licensed web sites/pages and the font file(s) themselves are secured to prevent unauthorized proliferation thereof. Use of the font files is tracked so that the font designer(s) (and/or typeface designer(s)) can be compensated for use of their fonts (typefaces) in an equitable fashion.

Figure 1:
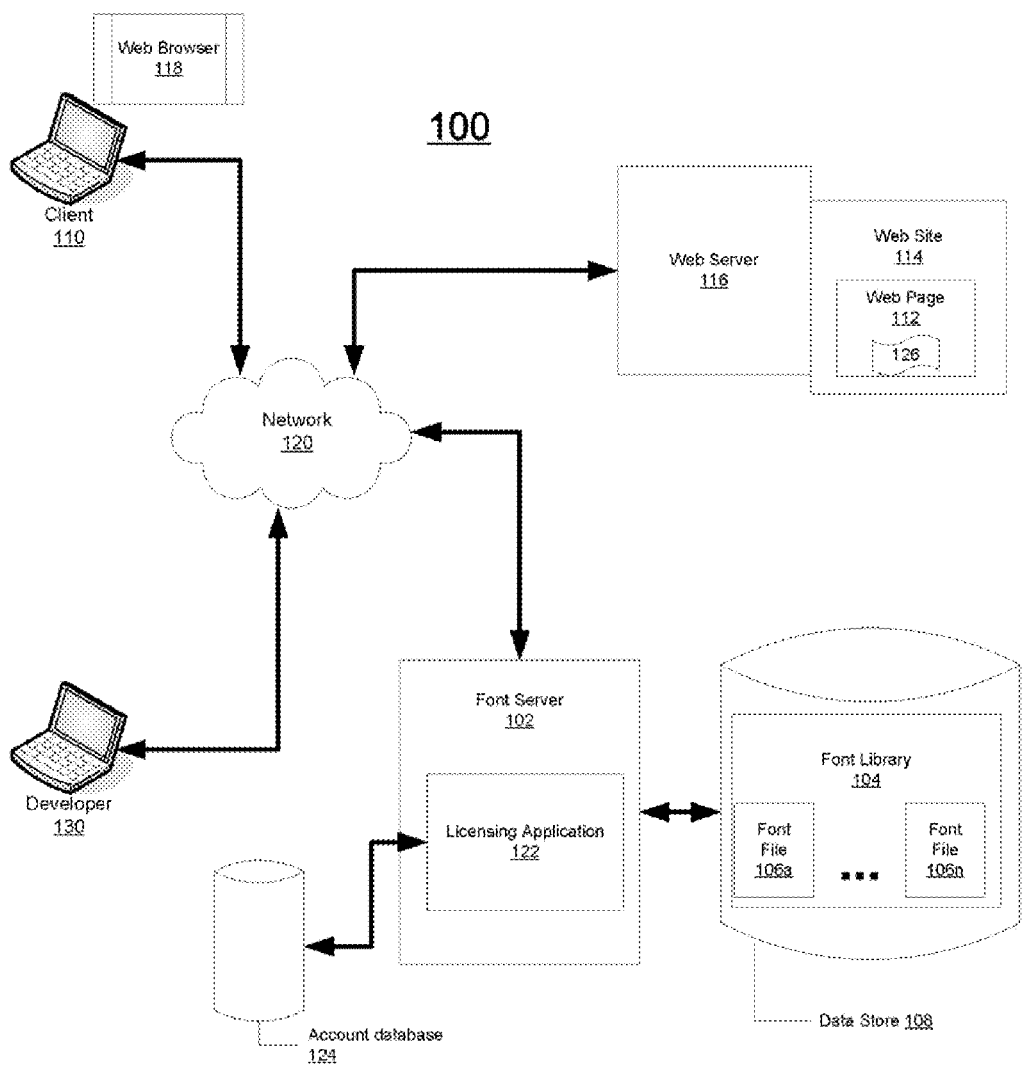
FIGS. 1 and 2 illustrate, respectively, a network environment that includes a font server configured in accordance with the present invention and communications amongst the constituent elements of the network to further the provision of font files in connection with the downloading of licensed web sites in accordance with the present invention.
Figure 2:
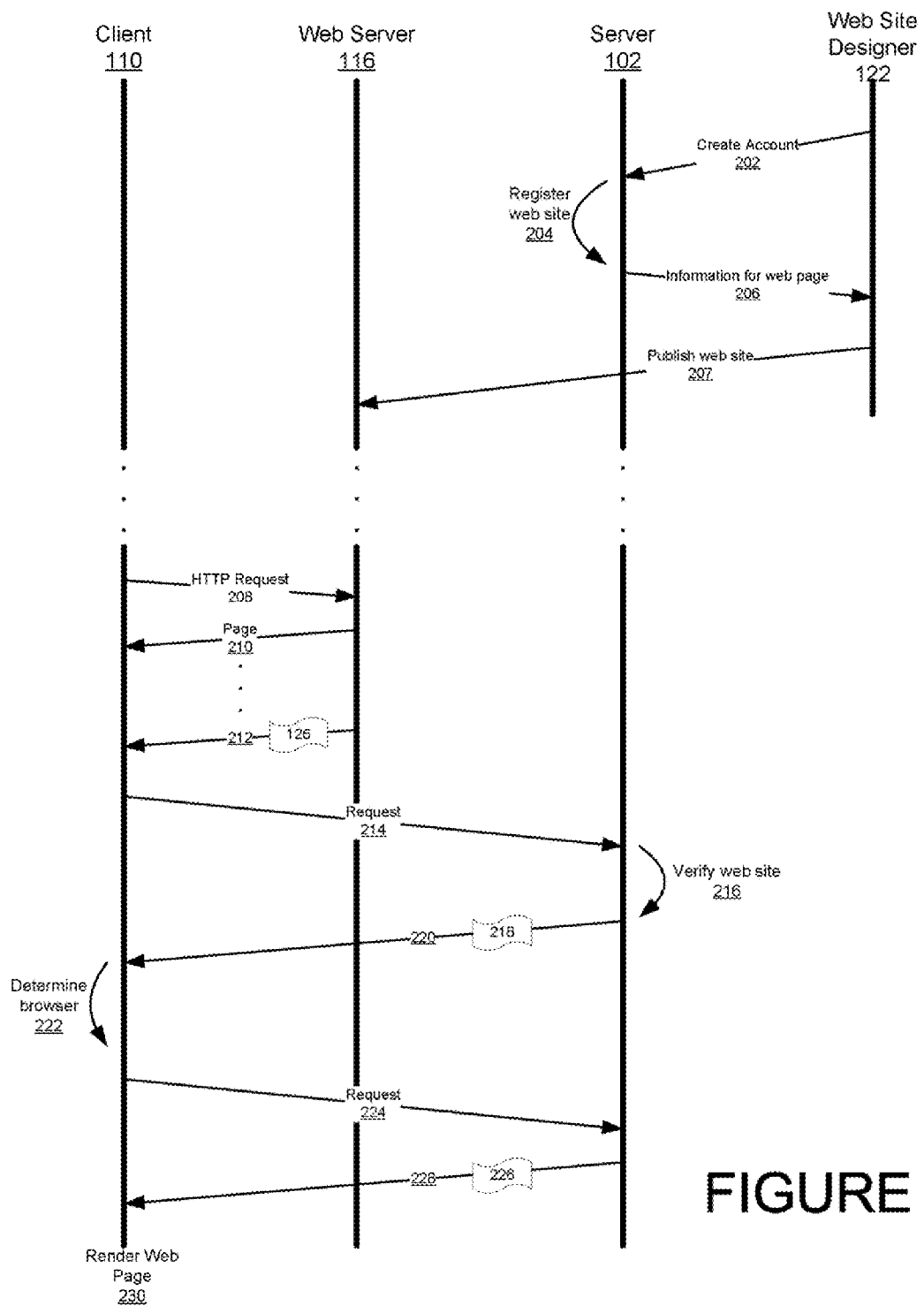

To more fully appreciate the features provided by the present methods and systems, refer to FIGS. 1 and 2. FIG. 1 shows a network 100 which includes a font server 102 that has an associated font library 104 made up of a number of font files 106a-106n. The font library may be hosted on one or more data storage devices 108 accessible to font server 102. In some cases, one or more font servers, such as font server 102, distributed (geographically and/or logically) at various locations, may have access to one or more font libraries stored on data storage devices distributed (geographically and/or logically) at various locations. For simplicity of the following discussion, only one font server/data store combination will be discussed, but readers should recognize that this does not preclude the use of multiple instances of such devices. In some cases data store 108 may be a hard drive or other local storage medium for font server 102, while in other instances data store 108 may be a database hosted on a separate storage device or plurality of storage devices.

Data store 108 is used as a storage location for font files 106a0106n, each of which is instantiated as computer readable instructions which, when executed by a client computer system 110 (e.g., one or more computer processors thereof), cause the computer system to render, on a display of computer system 110, glyphs and other symbols associated with a web page of a web site 114 hosted at a server 116 in an intended font. Such operations usually, though not necessarily, are performed in the context of a web browser 118 at client computer system 110 downloading web page 114.

Font server 102, client computer system 110 and web server 116 are communicatively coupled to one another via a communications network 120. Network 120 may be any form of communications means and, in some cases, may be individual communications links, or one or more communications networks, including private networks, public networks and/or virtual private networks over public networks. Network 120 may be, and often will be, the network of networks commonly known as the Internet.

Also shown in FIG. 1 is a computer system 130 used by a web site designer. In this example, computer system 130 is shown communicatively coupled to network 120, but this need not necessarily be the case. In some instances, computer system 130 will be a stand alone computer system and content created on computer system 130 will be transferred to web server 116 by means other than transmission via network 120. for example, such transfers may involve the use of physical media, such as compact disk read only memories (CD-ROMs), digital versatile disks (DVDs), flash memory-based storage media, or other physical means. The manner of such transfer such that web site 114 becomes hosted at web server 116 is not critical to the present invention.

The web site designer (or a team of such designers) creates web site 114 and the various web pages (including web page 112) associated therewith, each of which may include any variety of text, multimedia, and other content commonly associated with such web pages and web sites. The nature of the web sites and web pages is not critical to the present invention. What is important is that for at least some content (typically text) associated with web page 112, the web site designer wishes to employ a particular font. The subject font may be, and often is, one that is owned (i.e., the rights to control the distribution, use and/or reproduction thereof is/are owned) by someone other than the web site designer. Typically, such fonts are owned by typeface designers, font creators or their employers, commonly referred to as foundries.

Referring now to FIGS. 1 and 2 in combination, in order to obtain rights to use the desired font in connection with the subject Web site 114, the web site developer accesses font server 102, i.e., a font licensing application 122 hosted thereon, and creates an account 202 with a service providing the font licensing methods described herein. In some cases, the font licensing application 122 will be hosted at a server different than the font server 102, but for simplicity of explanation it is assumed that they are the same server. In the case of a different server hosting the licensing application, that server and the font server would be communicatively coupled to one another, either via network 120 or another communication means (e.g., a local area network (LAN)). Note, in some instances, the licensing application, user account, etc., may be accessed via appropriate application programming interfaces (APIs), client applications, web sites/portals or other access means.

After creating an account with the font licensing service, or if the web site designer already has an existing account, logging in to that existing account, the web site designer registers web site 114 and selects the fonts from font library 104 which are to be used in connection therewith 204. These registration details, along with other information, are stored in an account database 124 used by the font licensing application 122. Once the web site 114 has been registered in connection with the selected fonts, the licensing application provides 206 the web site designer with information 126 to be encoded in web site 114 or select pages thereof. This information, when downloaded to by a web browser loading a web page of web site 114, instructs the web browser to contact font server 102 in order to obtain the font files necessary to render the web page in the manner intended by the web designer. In some instances, the information may include a web address of font server 102 and/or other information needed by the web browser to contact the font server.

After receipt of this information, the web designer includes the above-described information in the appropriate web pages of web site 114 (e.g., those web pages which require the fonts from the font library). In some cases, different web pages may require different fonts and so may include information to contact different servers than or in addition to font server 102. The web site (or pages thereof) may then be published 207 to the web server 116.

At some time thereafter, a user associated with client computer 110 and engaged in a web browsing session directs a web browser running on client computer 110 to web site 114. For example, this may be done by entering the web address of web site 116 into the address filed of the web browser or by selecting a hyperlink to a web page 112 associated with web site 114. Such a hyperlink may be displayed on another web page, such as a web page including results of a search request submitted to a search engine. In either instance, the web browser may respond by issuing a hypertext transfer protocol (HTTP) request 208 (e.g., a GET request) to the designated web page.

In response to the HTTP request, data comprising web page 112 begins downloading from web server 116 to client computer 110 (i.e., to the browser running thereon) 210. Included in this information transfer will be information 126 which instructs the browser concerning the font server from which to obtain the font files needed to render at least portions of the web page 212. Based on this information, the browser sends a request 214 to the font server 102.

At the font server 102, a check is made to determine whether the request for the font is being made in connection with a licensed web site 216. In one embodiment of the invention, this entails the server examining header information in the request and, in particular, a referrer field of the header to obtain the address (e.g., URL) of the web page 112 which acted as the referrer for the browser to direct the request for fonts to the font server 102. The referrer information may be in the form of a uniform resource locator (URL) or other information. The font server checks this information against the web site registration information included in account database 124. If the request originated with an unlicensed web site, then no fonts are provided.

In the font server determines that the request originated with a licensed web site, such as web site 114, the font server begins the process of providing the necessary fonts. Rather than simply returning a font file to the browser, however, font server 102 first determines information regarding the web browser sufficient to determine which format of font file is needed by the browser. Different browsers support different font file formats and so the font server needs to know which format or formats is/are supported. It may do this by inspecting the web browser directly or by sending a script to determine information from within the browser. In the latter instance, font server 102 sends a file 218 containing computer executable instructions to the requesting browser 220. In one embodiment of the present invention, this file is a JavaScript™ file. JavaScript files enable programmatic access to computational objects within a host environment, such as a web browser running on client computer system 110. In this instance, JavaScript file 218 is configured such that when executed by a computer processor of client computer system 110 in the browser environment, the JavaScript file determines the type of browser currently running on client computer 110 and the kinds of fonts which it can support 222. Of course, other information regarding the browser and/or the client computer system 110 could also be obtained.

The JavaScript file then causes the browser to return this information regarding the browser type and capabilities (and any other desired information) to the font server 224 in return, the font server provides a properly encoded font file 226 to the browser 228. In some cases, information in addition to the font file may be provided. For example, custom cascading style sheets (CSSes) may be provided with the font file to account for particular rendering implementations that may exist with certain types of browsers. As further discussed below, the font file 226 is protected against unauthorized use or proliferation. At the client computer 110, the font file 226 is cached in the browser cache (e.g., for a period of time determined by a time to live parameter associated with the font file), and the browser makes use of the font file to render the subject web page 230.

The above-described methodology and infrastructure can be used to deliver any of a number of font files to browsers that are engaged in downloading and rendering of web pages that include fonts which are not currently installed at the client computer system on which the browsers are running. In addition, a similar procedure can be used to provide other style elements associated with the subject web sites. Because the font files are only cached temporarily at the client computer, they are not available for use with unlicensed web sites visited by the user of computer system 110.

Additional levels of protection for the font foundaries are also provided. For example, the JavaScript file and/or the font files (especially the font name tables) provided to client computer system are intentially obfuscated by encoding them as lists of strings of seemingly random characters. For example, the font files may be represented as Base64 encoded strings. In some cases, the font files may also be split into multiple files to be recombined at the browser using a CSS font stack.

The present systems and method thus provide an equitable basis on which to compensate foundries and/or individual font designers. In one example, foundries and other font designers (font providers) are compensated on the length of time that one of their fonts is associated with a registered web site. That is, when a web designer registers a web site and associates fonts from the font library with that web site, the web designer pays a license fee. The fee may be instantiated as an annual subscription fee (per designer and/or per web site or group of web sites), or as a one-time fee for the web site or on some other basis. Eventually, the web site designer may un-register the web site (thereby losing the ability to render the web site using the previously designated fonts) or alter the fonts used and registered in association therewith. In any event, the font provider may be compensated for the period of time that the provider's font was associated with the web site (e.g., irrespective of the number of actual view of the web site). So, if an annual subscription fee of $48 dollars is imposed on the web site developer, then for each month that a particular font provider's font is associated with the web site (e.g., as reflected in the account database discussed above), that font provider may be paid a portion of the monthly revenue attributable to a font license (e.g., a portion of the $4/month attributable to the web site developer's use of the font). Of course, other compensation/licensing schemes are possible using the above-described infrastructure.

The above-mentioned font licensing application may also provide other services to web site designers and font providers. For example, a set of tools that help font providers better understand how CSS works with their respective typefaces may be provided. Such tools may assist font providers check for missing glyphs, inconsistent font metrics (such as height and width parameters of the glyphs and components thereof), and metrics values that might clip glyphs. With this information, font providers and web designers can review and adjust their fonts for better translation in CSS.

Figure 3:
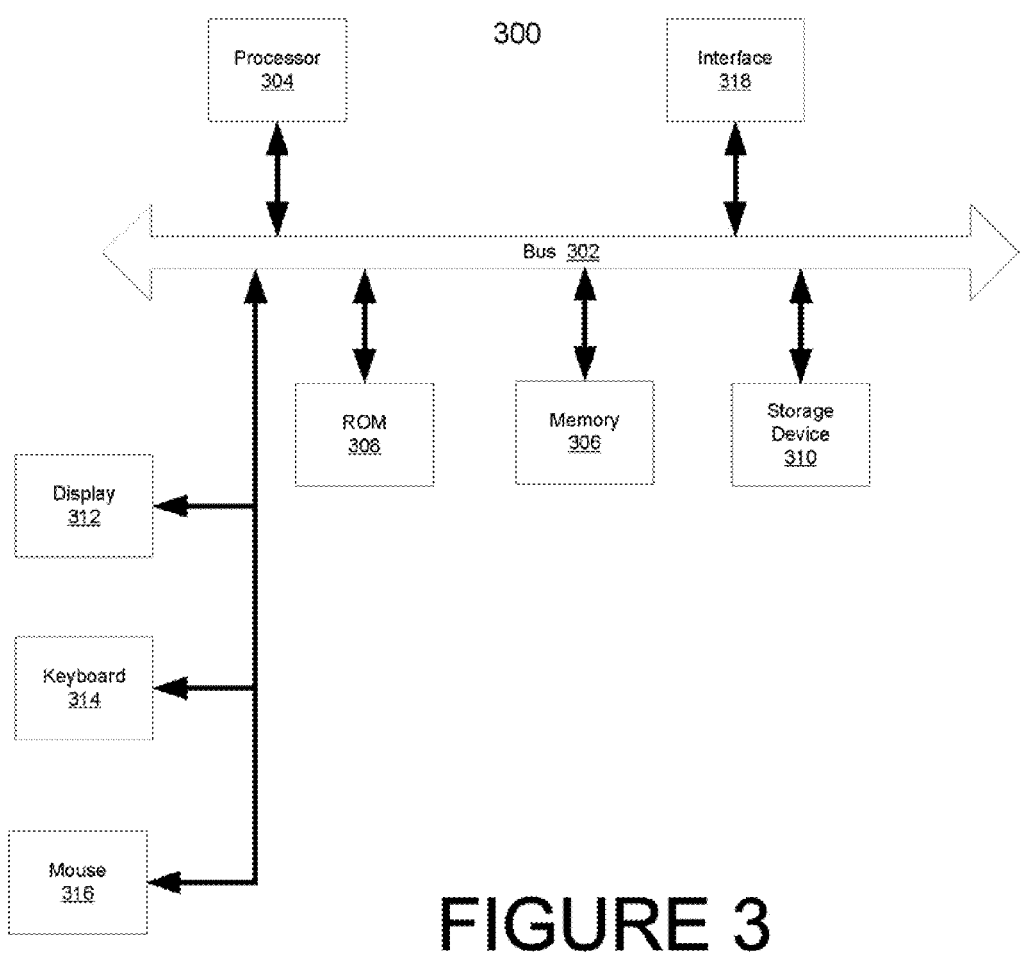
FIG. 3 illustrates an example of a computer system suitable for use in connection with embodiments of the present invention.

FIG. 3 is a block diagram illustrating an example of a computer system 300 upon which embodiments of the present invention may be implemented. For example, computer system 300 may represent any of client computer 110, font server 102, web server 116 and/or web designer server 130. Not that the various servers may not include the user interface devices (keyboards, mice, displays, etc.) referred to below and instead may be accessed by remote client computer systems that include such human interface means to allow for appropriate configuring of the subject server.

Computer system 300 includes a bus 302 or other communication mechanism for communicating information, and a processor 304 coupled with the bus 302 for processing information. Computer system 300 also includes a main memory 306, such as a random access memory (RAM) or other dynamic storage device, coupled to the bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to the bus 302 for storing static information and instructions for the processor 304. A storage device 310, such as a hard disk, is provided and coupled to the bus 302 for storing information and instructions.

Computer system 300 may be coupled via the bus 302 to user interface devices such as a display 212, e.g., a flat panel display, for displaying information to a computer user. An input device 314, including alphanumeric and other keys, is coupled to the bus 302 for communicating information and command selections to the processor 304. Another type of user input device is cursor control device 316, such as a mouse, a trackball, or cursor direction keys for communicating direction information and command selections to processor 304 and for controlling cursor movement on the display 312.

An appropriately configured computer system 300 instantiated in a role as a client, server or other computer system, performs the various activities associated with that role discussed above in response to processor 304 executing sequences of instructions contained in main memory 306. Such instructions may be read into main memory 306 from another computer-readable medium, such as storage device 310. However, the computer-readable medium is not limited to devices such as storage device 310. For example, the computer-readable medium may include a floppy disk, a flexible disk, hard disk, magnetic tape, or any other magnetic medium, a CD-ROM, a DVD-ROM, any other optical medium, punch cards, paper tape, any other physical medium with patterns of holes, a RAM, a PROM, an EPROM, a FLASH-EPROM, any other memory chip or cartridge. Execution of the sequences of instructions contained in the main memory 306 causes the processor 304 to perform the process steps described above. In alternative embodiments, hard-wired circuitry may be used in place of or in combination with computer software instructions to implement these processes.

Computer system 300 also includes a communication interface 318 coupled to the bus 302. Communication interface 318 provides a two-way data communication for computer system 300 and may be a modem or local area network (LAN) card that provides wired and/.or wireless communications to/from a network such as network 120 or other networks communicatively coupled thereto. Thus, computer system 300 can send messages and receive data, including the font files and associated JavaScript files discussed above, through network 120.

As should be evident from the foregoing description, various embodiments of the present invention may be implemented with the aid of computer-implemented processes or methods (a.k.a. programs or routines) that may be rendered in any computer language. Such processes are meant to encompass any series of logical steps performed in a sequence to accomplish a given purpose. The operations of the various computer systems were discussed in terms of algorithms and operations on data within memories or buffers and these algorithms and operations were intended to convey the nature of computer programs sufficient to direct the operations of the computer systems to perform the desired tasks. Hence, it should be appreciated that the use of terms such as "processing", "computing", "rendering" "calculating", "determining", "displaying" or the like, refer to the action and processes of computer processors and related computer hardware of the various computer systems described herein, or similar electronic computing devices, that manipulate and transform data. The computer programs that embody these processes may be stored in various computer readable storage mediums associated with the respective computer systems, such as, but not limited to, any type of disk including floppy disks, optical disks, CD-ROMs, DVDs and magnetic-optical disks, read-only memories (ROMs), flash drives, random access memories (RAMs), erasable programmable read only memories (EPROMs), electrically erasable programmable read only memories (EEPROMs), flash memories, other forms of magnetic or optical storage media, or any type of media suitable for storing electronic instructions, and accessible to the respective computer processor(s of the computer systems.

Thus, systems and methods for serving font files to computer based software applications (e.g., web browsers) during web browsing and other sessions which require the use of a font file not otherwise available at a client computer system at the time of the browsing session have been described.

What is claimed is:

1. A method, comprising:
    receiving, at a font server, a request based on a web page of a web site to download a font file to a web browser of a client computer system communicatively coupled to the font server;
    verifying, by the font server, that the web page of the web site is licensed to use the font file;
    providing, from the font server to the web browser, based on a successful verification, a script configured to ascertain one or more font file formats supported by the web browser;
    receiving, at the font server, an output from the script indicative of which of a plurality of font files are supported by the web browser; and
    providing the font file from the font server to the web browser based, at least in part, on the output indicating that the font file corresponds to a font file format supported by the web browser.

2. The method of claim 1, wherein the font server is distinct from a server hosting the web site.

3. The method of claim 1, wherein the font file is configured so as to be protected against unauthorized use.

4. The method of claim 1, wherein the font server verifies the request by consulting an account database to determine whether the font file is registered for use in connection with the web site.

5. The method of claim 4, wherein font server is configured to identify the website for purposes of the verification according to referrer request information included in the request received by the font server.

6. The method of claim 5, wherein identification information for the font server is encoded in the web page prior to the web browser downloading the web page.

7. The method of claim 1, wherein the request is sent from the web browser to the font server responsive to receipt of instructions concerning a location of the font file provided to the browser in connection with downloading of the web page.

8. The method of claim 1, further comprising compensating, via the font server, a developer associated with the font file according to a period of time that the font file remains associated with the web site.

9. An apparatus to provide a service, the apparatus comprising:
a processor;
memory to store instructions that, when executed by the processor cause the processor to:
receive, at a font server, a request based on a web page of a web site to download a font file to a web browser of a client computer system communicatively coupled to the font server;
verify that the web page of the web site is licensed to use the font file;
provide, from the font server to the web browser, based on a successful verification, a script configured to ascertain one or more font file formats supported by the web browser; and
provide the font file from the font server to the web browser based, at least in part, on the output indicating that the font file corresponds to a font file format supported by the web browser.

10. The apparatus of claim 9, wherein the apparatus is distinct from a server hosting the web site.

11. The apparatus of claim 9, wherein the font file is configured so as to be protected against unauthorized use.

12. The apparatus of claim 9, wherein the apparatus verifies the request by consulting an account database to determine whether the font file is registered for use in connection with the web site.

13. The apparatus of claim 12, wherein the apparatus is configured to identify the website for purposes of the verification according to referrer request information included in the request received by the apparatus.

14. The apparatus of claim 13, wherein identification information for the font server is encoded in the web page prior to the web browser downloading the web page.

15. The apparatus of claim 9, wherein the request is sent from the web browser to the apparatus responsive to receipt of instructions concerning a location of the font file provided to the browser in connection with downloading of the web page.

16. The apparatus of claim 9, wherein the instructions, when executed by the processor, further cause the processor to compensate a developer associated with the font file according to a period of time that the font file remains associated with the web site.

17. A non-transitory computer-readable medium embodying instructions that, when executed by a processor perform operations comprising:
receiving a request based on a web page of a web site to download a font file to a web browser of a client computer system communicatively coupled to the font server
verifying that the web page of the web site is licensed to use the font file;
providing, from the font server to the web browser, based on a successful verification, a script configured to ascertain one or more font file formats supported by the web browser;
receiving an output from the script indicative of which of a plurality of font files are supported by the web browser; and
providing the font file from the font server to the web browser based, at least in part, on the output indicating that the font file corresponds to a font file format supported by the web browser.

18. The non-transitory computer-readable medium of claim 17, wherein the font server is distinct from a server hosting the web site.

19. The non-transitory computer-readable medium of claim 17, wherein the font file is configured so as to be protected against unauthorized use.

20. The non-transitory computer-readable medium of claim 17, wherein the font server verifies the request by consulting an account database to determine whether the font file is registered for use in connection with the web site.

* * * * *